US009157418B2

(12) United States Patent
Petersen et al.

(10) Patent No.: US 9,157,418 B2
(45) Date of Patent: Oct. 13, 2015

(54) SUSTAINABLE POWER SUPPLY UNIT FOR ISO CONTAINERS

(75) Inventors: Kim Ahrenfeldt Petersen, Ronde (DK); Alastair Murrey Hoegh Persson, Hundslund (DK); Borge Christensen, Ebeltoft (DK)

(73) Assignee: SOLARDRIVE CONTAINER POWER ApS (DK)

( * ) Notice: Subject to any disclaimer, the term of this patent is extended or adjusted under 35 U.S.C. 154(b) by 328 days.

(21) Appl. No.: 13/225,095

(22) Filed: Sep. 2, 2011

(65) Prior Publication Data

US 2013/0056991 A1    Mar. 7, 2013

(51) Int. Cl.
*F03D 9/00* (2006.01)
*H01L 31/042* (2014.01)
*H02S 30/10* (2014.01)

(52) U.S. Cl.
CPC ............... *F03D 9/007* (2013.01); *H02S 20/00* (2013.01); *H02S 30/10* (2014.12); *F05B 2240/9152* (2013.01); *Y02E 10/50* (2013.01); *Y02E 10/728* (2013.01)

(58) Field of Classification Search
CPC ................... E04B 1/34336; E04H 2001/1283; B65D 88/121; B65D 88/128; B65D 88/129; F05B 2240/142; F05B 2220/708; F17C 2227/0369; Y02E 10/728; Y02E 10/50; F03D 9/007; H02S 20/00; H02S 30/10
See application file for complete search history.

(56) References Cited

U.S. PATENT DOCUMENTS

| | | | | |
|---|---|---|---|---|
| 5,816,423 A * | 10/1998 | Fenton et al. | | 220/1.5 |
| 6,877,939 B2 * | 4/2005 | Tomkins et al. | | 410/46 |
| 7,040,848 B2 * | 5/2006 | Sain | | 410/46 |
| 7,230,819 B2 * | 6/2007 | Muchow et al. | | 361/601 |
| 7,793,467 B1 * | 9/2010 | Melton et al. | | 52/79.1 |
| 8,122,628 B2 * | 2/2012 | Johnson, Jr. | | 40/591 |
| 8,254,090 B2 * | 8/2012 | Prax et al. | | 361/641 |
| 8,294,285 B2 * | 10/2012 | Hunter | | 290/1 R |
| 8,397,441 B2 * | 3/2013 | Wallance | | 52/79.1 |
| 2004/0124711 A1 | 7/2004 | Muchow et al. | | |
| 2007/0113882 A1 | 5/2007 | Meyers | | |
| 2011/0146751 A1 * | 6/2011 | McGuire et al. | | 136/245 |
| 2012/0085756 A1 * | 4/2012 | Beitler et al. | | 220/1.5 |
| 2013/0014450 A1 * | 1/2013 | Esposito | | 52/11 |

FOREIGN PATENT DOCUMENTS

WO    03034505 A1    4/2003
WO    2008083219 A2    7/2008

OTHER PUBLICATIONS

Container Handbook, Section 3.2 Container dimensions and weights, German marine insurers, 2014.*
Danish Search Report; Application No. PA 2009 00367; Oct. 27, 2009; 2 pages.

* cited by examiner

*Primary Examiner* — Michael Zarroli
(74) *Attorney, Agent, or Firm* — St. Onge Steward Johnston & Reens LLC

(57) ABSTRACT

A sustainable power supply unit for ISO containers that includes photo voltaic solar panels that produce electric power allowing standardized mounting and attachment on top of ISO containers. The power supply unit can include ISO container corner castings that allow two or more sustainable power supply units to be stacked during transportation and storage. The power supply unit can include a maximum power point tracker, electrical batteries, data handling equipment and an inverter for supplying plug and play electric power to an ISO container or other electricity demanding equipment.

11 Claims, 5 Drawing Sheets

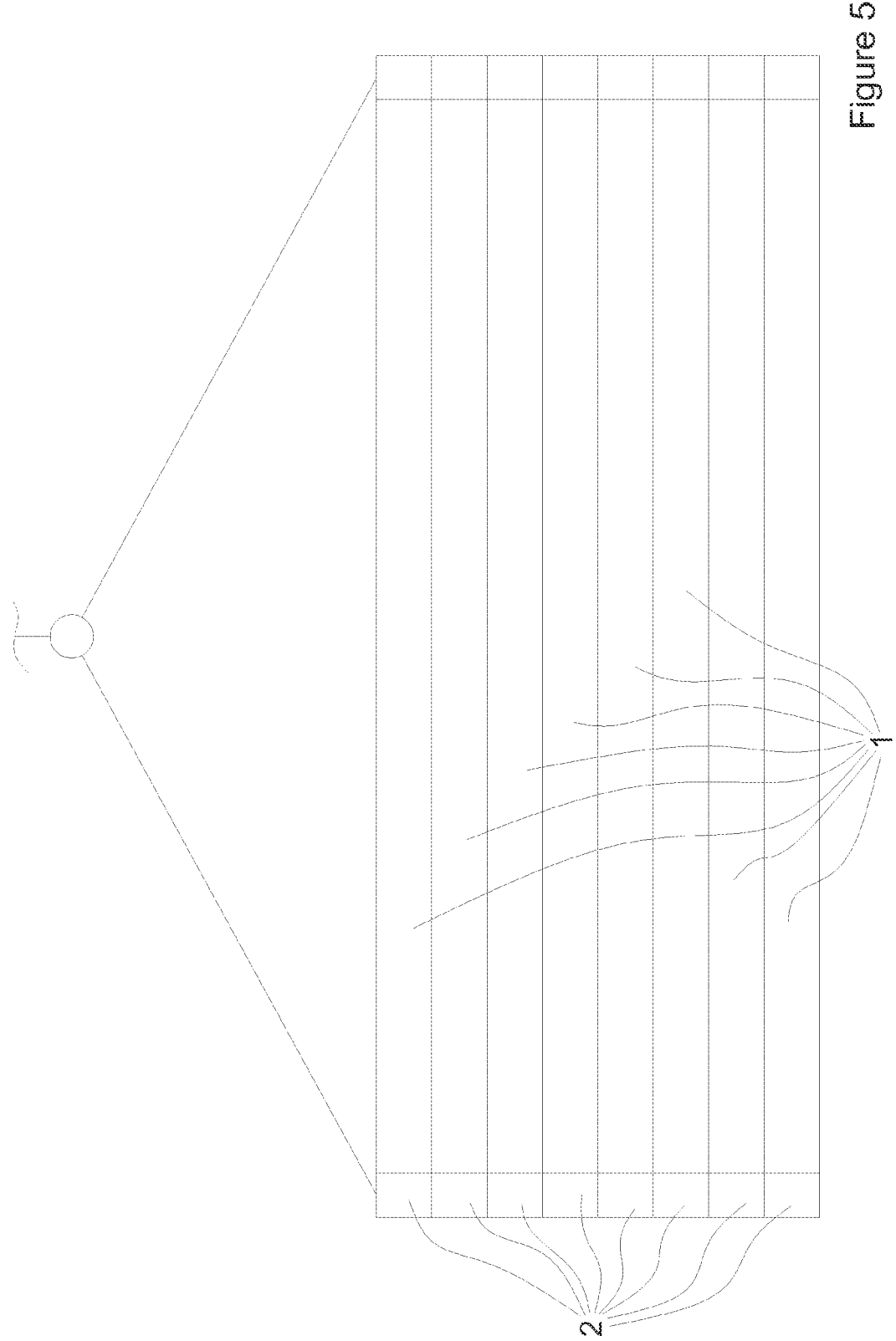

SUSTAINABLE POWER SUPPLY UNIT FOR ISO CONTAINERS

FIELD OF THE INVENTION

The present invention relates to the field of power supply units for containers applied in transportation of goods or any other purpose, where such containers use electricity for heating, cooling, lighting or electronic equipment of any kind.

BACKGROUND OF THE INVENTION

Intermodal freight containers, which can be moved from one mode of transport to another (from ship, to rail, to truck, etc.) without unloading and reloading the contents of the container, are often referred to simply as ISO containers, insofar as they fulfill the requirements of certain standards from the International Organization for Standardization (ISO).

Whereas the specification of the ISO container itself are defined in the standard "ISO 668, Series 1 freight containers—Classification, dimensions and ratings", special ISO container corner castings are defined in the standard "ISO 1161, Series 1 freight containers—Corner fittings—Specification". A standardized way of mounting, by use of such ISO container corner castings, ISO containers to each other and to the carrier (ship/rail/truck) on which they are to be transported is described in the standard "ISO/NP 3874, Series 1 freight containers—Handling and securing.

Examples of solar power systems for containers are already known. Until now, however, these solutions have shown different draw backs, especially by difficult and slow attachment systems. Some of the known power systems are also hindering easy movement of the container when first attached.

SUMMARY OF THE INVENTION

A sustainable power supply unit for ISO containers includes photo voltaic solar panels that produce electric power as well as ISO container corner castings allowing mounting and attachment on top of ISO containers and/or stacking of two or more sustainable power supply units during transportation and storage. The power supply unit has the same length and width as an ISO container and a height corresponding to 50% or less of the height of an ISO container so that a stack including two or more power supply units forms a unit that, during transportation and storage, can be handled like a single ISO container.

The invention relates to a sustainable power supply unit for ISO Containers used for transportation of goods and for many other purposes. The electric power supply from the unit can be used for heating, cooling, lighting, electric equipment etc. during transportation on container ships and trucks or while the ISO container is stored or applied in building sites, military camps, refugee camps, hospitals, offices, exhibitions, living quarters etc.

The invention is characterized by being shaped as a very small container, whose height is relatively small related to length and width and by the inclusion of ISO container corner castings enabling fast attachment and detachment to a standard ISO container in demand for electricity.

Furthermore the invention is characterized by including sustainable power sources such as photo voltaic solar panels and/or wind turbines as well as electrical batteries and an electronic control system for optimizing the solar and wind power production and battery charging as well as providing constant powering of ISO containers or other electricity consumers. For purpose of easy transportation and storage the invention can be handled, stacked and interconnected in the same way as ISO containers. When stacked and locked several power units may be handled together as one unit, just like a standard ISO container. When connected to the side of an ISO container, the invention can also be used as pent roof or an extra power unit. The invention can be connected by the corners allowing several sustainable power supply units to function together. By using a known technique as pillars the invention can cover and protect a random size area and at the same time provide electric power. The sustainable power supply unit can include a mechanism, called a tracking system, for automatic or manual 1-, 2- or 3-dimensional adjustment of the solar panels enabling a more direct solar insolation on the photo voltaic solar panels.

BRIEF DESCRIPTION OF THE DRAWINGS

In the following, a few embodiments of the invention will be described in further detail with reference to the figures, in which

FIG. 5 illustrates several power supply units being handled together as one unit.

DETAILED DESCRIPTION OF THE INVENTION

Figure 1:
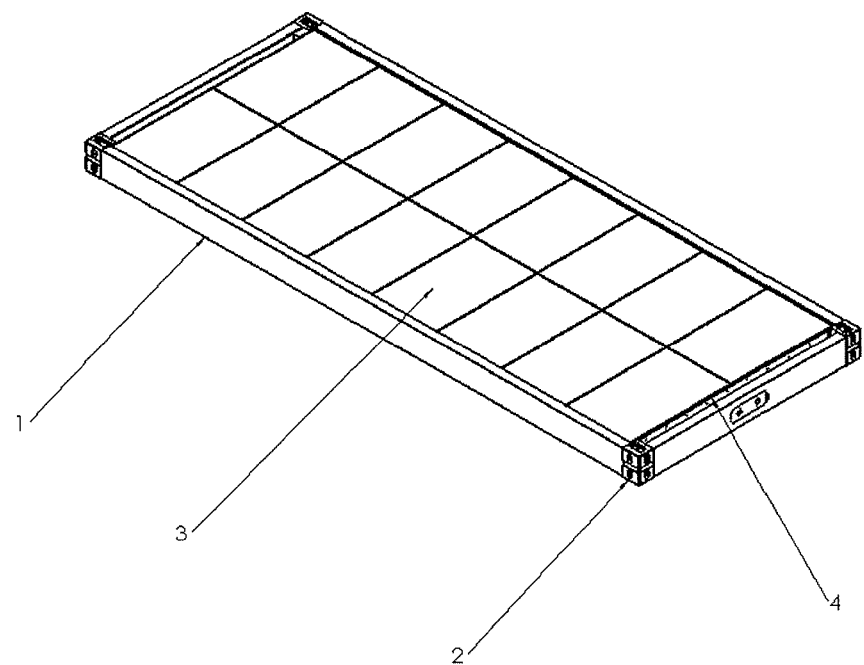
FIG. 1 illustrates a sustainable power supply unit according to an embodiment of the invention as seen in perspective from above.

FIG. 1 illustrates a sustainable power supply unit according to an embodiment of the invention as seen in perspective from above. The power supply unit comprises a the main frame 1 connected in the corners by standard ISO container corner castings 2, a sub frame 4 attached to the main frame 1 and functioning as a carrier for solar panels 3.

Figure 2:
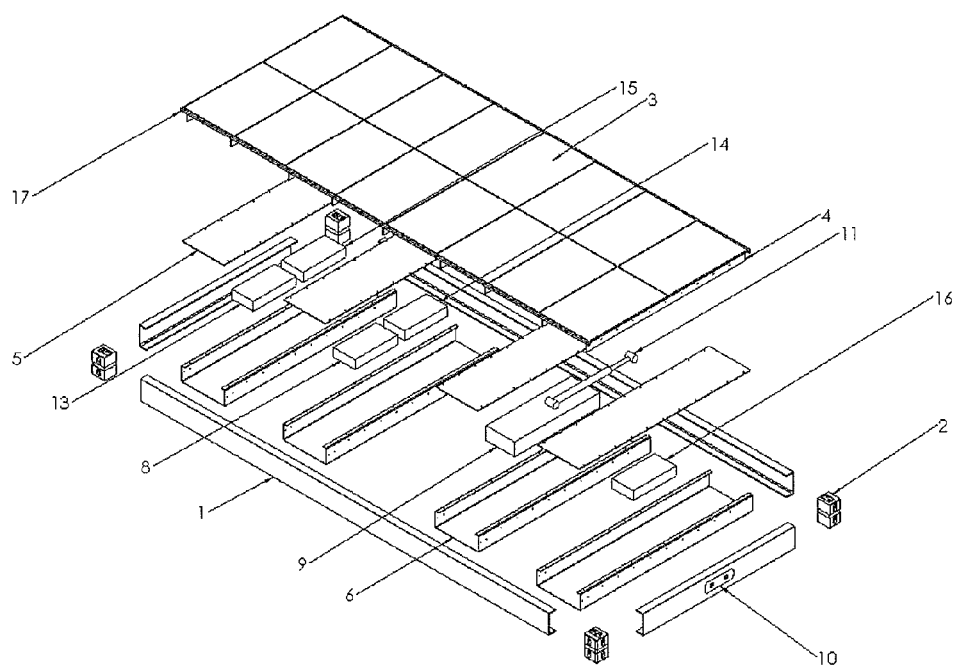
FIG. 2 illustrates an exploded view of a sustainable power supply unit according to an embodiment of the invention.

FIG. 2 illustrates the sustainable power supply unit in an exploded view. Besides the main frame 1, the corners castings 2 and the sub frame 4 carrying the solar panels 3 this figure shows extractable solar panels 5 and traverse U-profile carriers 6 for installation of electrical batteries 9 and controller electronics. In this embodiment, the sustainable power supply unit has a drainage system 17 for rain water.

Figure 3:
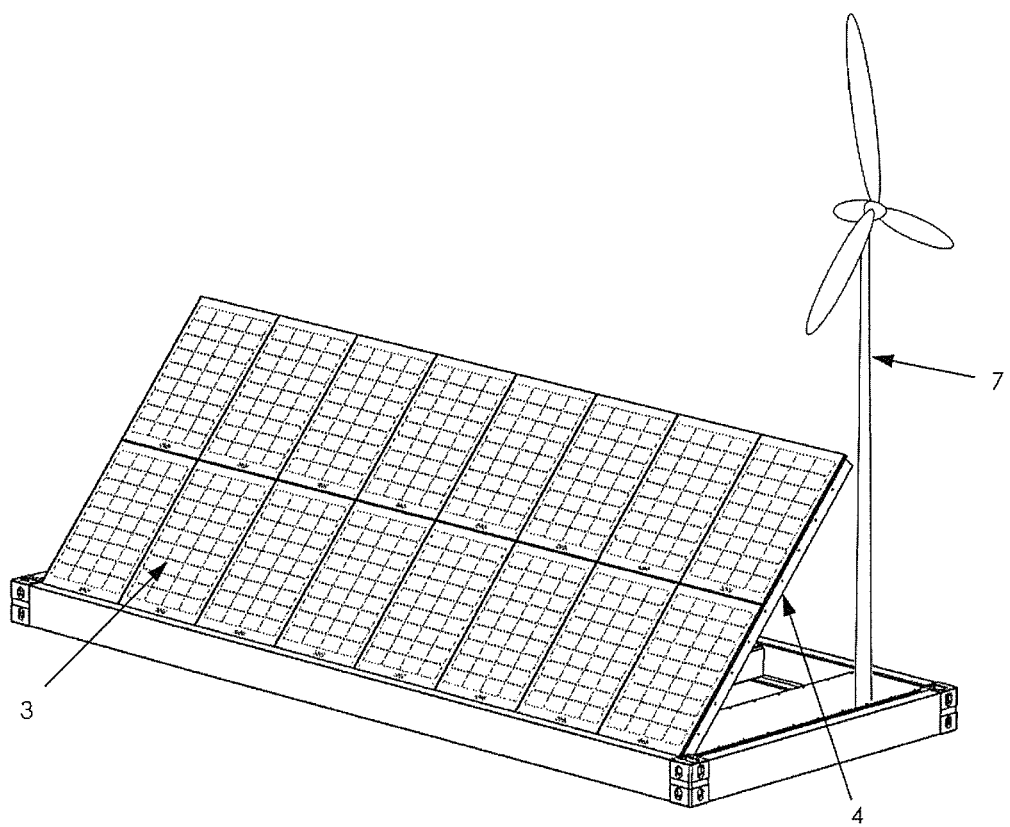
FIG. 3 illustrates a sustainable power supply unit according to an embodiment of the invention with wind turbine and solar panel adjusted for optimizing solar insolation.

FIG. 3 illustrates a sustainable power supply unit according to an embodiment of the invention, where the sub frame 4 carrying the solar panels 3 has been adjusted for optimal solar insolation and a wind turbine 7 is unfolded.

The sustainable power supply unit is constructed to facilitate easy attachment to a standard ISO container using the standard handling equipment found in the container industry worldwide.

Figure 4:
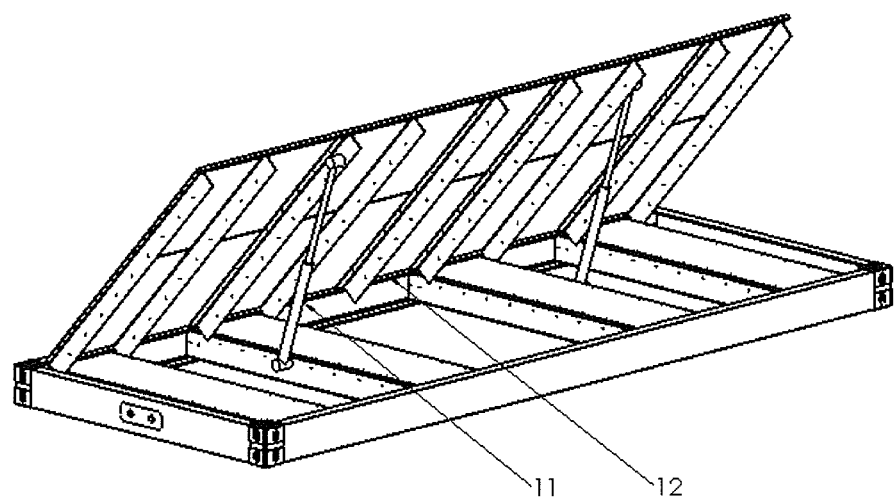
FIG. 4 illustrates a sustainable power supply unit according to an embodiment of the invention without a wind turbine and with the solar panel adjusted for optimizing solar insolation.

The main frame 1 in FIG. 1 is designed as a U-profile but other shapes may be used. At the corners, the main frame 1 is assembled by use of standard ISO corner castings 2. The sub frame 4 is attached to the main frame 1 and carries the photo voltaic solar panels 3 producing the electric energy. The solar panels 3 may be tilted along a longitudinal axis 12 as shown in FIGS. 3 and 4 and/or a traversal axis to obtain a more direct solar insolation and a higher efficiency. FIG. 2 shows the traverse U-profiles 6 as possible carriers for electrical batteries 9 and controller electronics and as an important element for adding strength to the unit. Also, FIG. 2 shows the extra solar panels 5, which can be extracted from slots (not shown) in the main frame 1 for easy mounting at the side of the container for boosting the power production. FIG. 3 illustrates the sustainable power supply unit where the sub frame 4 carrying the solar panels 3 has been raised to an upright position (0-90 degrees) by a lifting mechanism 11 attached to the U-profile for obtaining optimal solar insolation. FIG. 3 also shows a wind turbine 7 unfolded.

The sustainable power supply unit has been developed as a stand-alone, plug-and-play unit. When it is found useful and available, however, the unit can be connected to the grid allowing, for example, power to be fed into the grid during the day and withdrawn during the night and hereby reducing the electrical battery demand yet keeping sustainability. In the U-profiles 6 the demanded (customer specific) electrical battery capacity is loaded. Also the necessary controller electronics might be placed here. The controller electronics might include a maximum power point tracker 13 for optimizing the solar power production, charge controller for optimizing the battery charging process, DC-DC or DC-AC inverter 8 for converting the voltage and current delivered by the solar panels 3,5 to a relevant voltage/current relationship useful for the specific application. Furthermore, the unit may include logging 14 and communication hardware 15, data handling equipment 16, and software facilitating easy surveillance of the functionality.

As an illustration of the inventions applicability, a common containership carrying for example 300 40' ISO containers in the top layer may be taken as an example. Using the most common solar cells with an efficiency of 15%, every sustainable power supply unit will be able to produce 12-24 kWh per day or totally 3.6-7.2 MWh per day in this example, potentially replacing an equivalent amount of fossil fuel.

Another example: In the harbor, a number of sustainable power supply units may be stacked while waiting for being used. A reefer container may arrive at the harbor and be unloaded to the dock where it has to wait for a truck for the next part of the journey. A sustainable power supply unit may be picked from the stack by a container crane and placed on top of the reefer container. Connectors are plugged in via plugs 10, and the built-in electronics takes over the power control while checking and adjusting the optimal position of the solar panels 3, determining the need for extracting the extra solar panels 5 or unfolding the wind turbine 7. When the container is picked up by a truck, the sustainable power supply unit can stay on the container all the way to the destination if desired.

ISO containers are used for countless purposes, and other applications may be international relief assistances (where the invention may be used for sustainable power supply in medical clinics, operating rooms, offices and living quarters), refugee camps, military camps, construction sites, remote measurement stations, etc.

What is claimed is:

1. A sustainable power supply unit for ISO containers comprising photo voltaic solar panels that produce electric power, a mainframe forming the sides of said unit, ISO corner castings attached to each corner of said mainframe, the height of said mainframe being less than three feet, said ISO container corner castings allowing mounting and attachment on top of ISO containers and stacking of two or more sustainable power supply units during transportation and storage,
   wherein the power supply unit has the same length and width as an ISO container so that a stack comprising two or more power supply units forms a unit that, during transportation and storage, can be handled like a single ISO container, said stack complying with the ISO container standard.

2. A sustainable power supply unit according to claim 1, further comprising a maximum power point tracker, electrical batteries, data handling equipment and an inverter for supplying plug and play electric power to an ISO container or other electricity demanding equipment.

3. A sustainable power supply unit according to claim 1, further comprising transverse beams having U-shaped profiles oriented with the open side upward allowing easy and safe placement of electrical batteries and other equipment into the power supply unit from above.

4. A sustainable power supply unit according to claim 1, further comprising a data logger and a communication unit that remotely survey and control the power supply unit.

5. A sustainable power supply unit according to claim 1, further comprising a drainage system for rain water.

6. A sustainable power supply unit according to claim 1, further comprising a mechanism allowing side by side coupling and electrical connection of several sustainable power supply units.

7. A sustainable power supply unit according to claim 1, further comprising a foldable wind turbine that produces electric power.

8. A sustainable power supply unit according to claim 1, further comprising a mechanical system that orients the solar panels towards the sun.

9. The sustainable power supply unit according to claim 4, wherein the data logger and communication unit is a personal computer.

10. A sustainable power supply unit for ISO containers comprising photo voltaic solar panels that produce electric power, a mainframe forming the sides of said unit, ISO container corner castings attached to each corner of said mainframe, said ISO container corner castings allowing mounting and attachment on top of ISO containers and stacking of two or more sustainable power supply units during transportation and storage,
   wherein the power supply unit has the same length and width as an ISO container and a height less than three feet so that a stack comprising two or more power supply units forms a unit that, during transportation and storage, can be stacked together and transported as a single ISO container, said stack complying with the ISO container standard.

11. A sustainable power supply unit for ISO containers comprising photo voltaic solar panels that produce electric power, a mainframe forming the sides of said unit, ISO corner castings attached to each corner of said mainframe, the height of said mainframe being less than three feet, the length and width of said mainframe being equivalent to that of an ISO container, and said ISO container corner castings allowing mounting and attachment on top of ISO containers.

* * * * *